United States Patent
Goggins (10) Patent No.: US 11,677,907 B2
(45) Date of Patent: *Jun. 13, 2023

(54) MEDIA STREAM STORAGE FOR MULTI-REGION TELECONFERENCE

(71) Applicant: Cisco Technology, Inc., San Jose, CA (US)

(72) Inventor: Joseph Goggins, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,234

(22) Filed: Dec. 17, 2021

(65) Prior Publication Data

US 2022/0329759 A1 Oct. 13, 2022

Related U.S. Application Data

(63) Continuation of application No. 17/226,602, filed on Apr. 9, 2021, now Pat. No. 11,258,984.

(51) Int. Cl.
*H04N 7/15* (2006.01)
*H04L 65/403* (2022.01)

(52) U.S. Cl.
CPC .......... *H04N 7/155* (2013.01); *H04L 65/403* (2013.01)

(58) Field of Classification Search
CPC ... H04L 67/1097; H04L 65/403; H04L 67/52; H04N 7/155; H04N 7/152; H04N 7/15;

(Continued)

(56) References Cited

U.S. PATENT DOCUMENTS 9,699,409 B1 * 7/2017 Reshef .................. G06F 3/0484
2013/0258043 A1 * 10/2013 Amano .............. H04L 12/1831
348/14.08

(Continued)

FOREIGN PATENT DOCUMENTS

| EP | 3340564 A1 | 6/2018 |
| WO | 0141446 A1 | 6/2001 |
| WO | WO-2017173966 A1 * | 10/2017 |

OTHER PUBLICATIONS

International Search Report and Written Opinion in counterpart International Application No. PCT/US2022/023008, dated Jun. 9, 2022, 14 pages.

(Continued)

*Primary Examiner* — Melur Ramakrishnaiah
(74) *Attorney, Agent, or Firm* — Edell, Shapiro & Finnan, LLC (57) ABSTRACT

Techniques are presented for storing media streams for a multi-region teleconference. One example involves a first server configured to serve a first geographic region, a second server configured to serve a second geographic region, and a coordination server. The coordination server is configured to provide, to the first server and the second server, an indication to store one or more media streams of a teleconference that is or will be joined by a first endpoint device in the first geographic region and a second endpoint device in the second geographic region. The first server is configured to store a first media stream of the teleconference generated by the first endpoint device in the first geographic region, and the second server is configured to store a second media stream of the teleconference generated by the second endpoint device in the second geographic region.

20 Claims, 7 Drawing Sheets

(58) Field of Classification Search
CPC ... H04N 7/147; H04M 3/562; H04M 3/42221
USPC .......................................... 348/14.01–14.16
See application file for complete search history.

(56) References Cited

U.S. PATENT DOCUMENTS

| | | |
|---|---|---|
| 2015/0098693 A1 | 4/2015 | Shaffer et al. |
| 2015/0381936 A1 | 12/2015 | Goyal et al. |
| 2016/0234265 A1 | 8/2016 | Lohe |
| 2017/0302718 A1 | 10/2017 | Ananthanarayanan et al. |
| 2017/0359391 A1* | 12/2017 | Pai .................... H04L 65/1083 |
| 2018/0249122 A1 | 8/2018 | Reshef et al. |
| 2018/0332008 A1 | 11/2018 | Norman et al. |
| 2020/0351360 A1 | 11/2020 | Fahlgren et al. |
| 2020/0380152 A1 | 12/2020 | Shriver et al. |

OTHER PUBLICATIONS

Rosenberg, Jonathan, "Zero Second Meeting Joins," Technical Disclosure Commons, Defensive Publications Series, Oct. 17, 2018, 4 pages.

Clayton, Richard, "Understanding the GDPR Call Recording Rules," NICE, Feb. 3, 2020, 6 pages; https://www.nice.com/engage/blog/mcr-understanding-the-gdpr-call-recording-rules-2531/.

Tolson, Bill, "Data Sovereignty and the GDPR; Do You Know Where Your Data is?" Archive360, Feb. 14, 2019, 9 pages; https://www.archive360.com/blog/data-sovereignty-and-the-gdpr-do-you-know-where-your-data-is.

IT Governance, "Data Sovereignty and the Cloud", Nov. 11, 2020, 5 pages; https://www.itgovernance.co.uk/data-sovereignty-and-the-cloud.

Palermo, Chris, "The Story of Webex Teams . . . Revisited!" ASi Networks, Sep. 3, 2019, 9 pages; https://www.asi-networks.com/the-story-of-webex-teamsrevisited.

* cited by examiner

MEDIA STREAM STORAGE FOR MULTI-REGION TELECONFERENCE

CROSS REFERENCE TO RELATED APPLICATION

This application is a continuation of U.S. application Ser. No. 17/226,602, filed Apr. 9, 2021, the entirety of which is incorporated herein by reference.

TECHNICAL FIELD

The present disclosure relates to computer networking.

BACKGROUND

In a teleconference, two or more geographically remote participants can communicate with each other. A teleconference might involve a call between two participants, such as a customer and a contact center agent, or a conference with multiple participants. User endpoints allow the participants to exchange audio and video during the teleconference. Participants can record the teleconference by storing the audio and video, and after the teleconference has ended, the recording can be accessed by listening to the stored audio and/or viewing the stored video.

DESCRIPTION OF EXAMPLE EMBODIMENTS

Overview

Techniques are presented for storing media streams for a multi-region teleconference. One example involves a first server configured to serve a first geographic region, a second server configured to serve a second geographic region, and a coordination server. The coordination server is configured to provide, to the first server and the second server, an indication to store one or more media streams of a teleconference that is or will be joined by a first endpoint device in the first geographic region and a second endpoint device in the second geographic region. The first server is configured to store a first media stream of the teleconference generated by the first endpoint device in the first geographic region, and the second server is configured to store a second media stream of the teleconference generated by the second endpoint device in the second geographic region.

Example Embodiments

Figure 1:
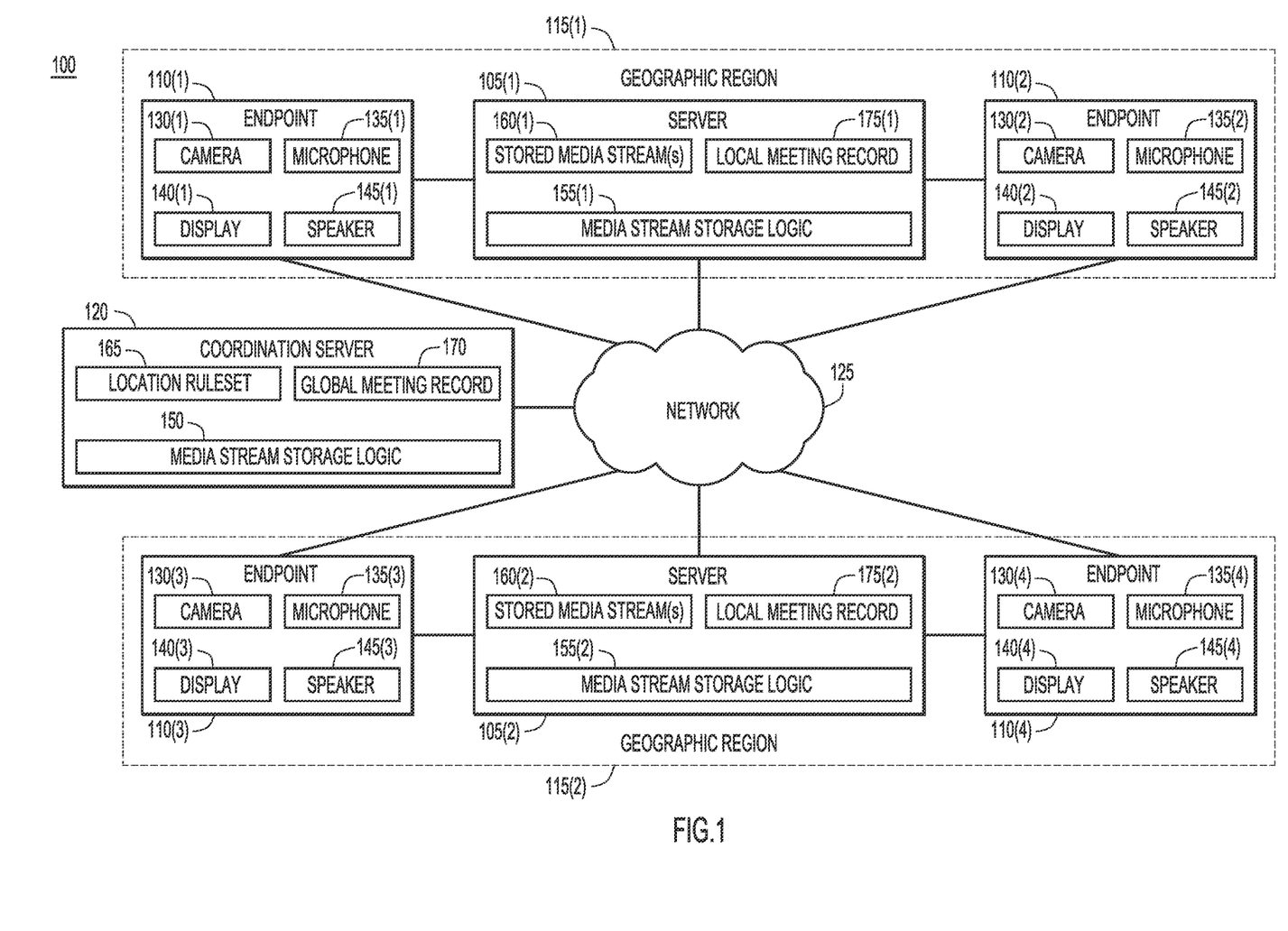
FIG. 1 illustrates a system configured for media stream storage for a multi-region teleconference, according to an example embodiment.

With reference made to FIG. 1, shown is an example system 100 configured for media stream storage for a multi-region teleconference. System 100 includes server 105(1), endpoint device 110(1), and endpoint device 110(2), which are located in geographic region 115(1). System 100 also includes server 105(2), endpoint device 110(3), and endpoint device 110(4), which are located in geographic region 115(2). System 100 additionally includes coordination server 120 and network 125. While system 100 includes four endpoint devices (i.e., endpoint devices 110(1)-110(4)) and two geographic regions (i.e., geographic region 115(1) and geographic region 115(2)), techniques described herein may be compatible with any suitable number of endpoint devices and geographic regions.

Endpoint devices 110(1)-110(4) may be any suitable mobile device (e.g., phones, laptops, etc.) or fixed device (e.g., a desktop device) capable of communicating over network 125. Geographic region 115(1) and geographic region 115(2) may be any suitable physical area/location governed by a set of regulations, such as a country, jurisdiction, territory, province, state, and/or collection thereof. Coordination server 120 may be located in any suitable location. Network 125 may be any suitable network to enable various components of system 100 to communicate with each other, such as the Internet.

Endpoint devices 110(1)-110(4) may enable respective participants to participate in a teleconference. For example, endpoint device 110(1) may enable a first participant, located in geographic region 115(1), to participate in the teleconference; endpoint device 110(2) may enable a second participant, located in geographic region 115(1), to participate in the teleconference; endpoint device 110(3) may enable a third participant, located in geographic region 115(2), to participate in the teleconference; and endpoint device 110(4) may enable a fourth participant, located in geographic region 115(2), to participate in the teleconference. To that end, endpoint devices 110(1)-110(4) respectively include cameras 130(1)-130(4), microphones 135(1)-135(4), displays 140(1)-140(4), and speakers 145(1)-145(4).

In one example, endpoint device 110(1) may provide one or more media streams (e.g., one or more audio and/or audio/video streams) to endpoint devices 110(2)-110(4). For example, camera 130(1) may capture video (e.g., video of the first participant) and send the video over network 125 to endpoint devices 110(2)-110(4). Similarly, microphone 135(1) may capture audio (e.g., audio of the first participant) and send the audio over network 125 to endpoint devices 110(2)-110(4). This video and audio originated in geographic region 115(1) because endpoint device 110(1) is located in geographic region 115(1).

Endpoint device 110(1) may also obtain one or more media streams from endpoint devices 110(2)-110(4). For example, endpoint device 110(1) may receive video from endpoint devices 110(2)-110(4) via network 125 and display the video on display 140(1). Endpoint device 110(1) may also receive audio from endpoint devices 110(2)-110(4) via network 125 and output the audio from speaker 145(1). Endpoint devices 110(2)-110(4) may similarly enable the second, third, and fourth participants to participate in the teleconference. In one example, endpoint devices 110(1)-

110(4) may exchange media streams via a video bridge or teleconference hosting server (meeting server) in network 125.

Traditionally, when a teleconference is recorded, copies of teleconference media streams are stored at one or more servers in the "cloud"—that is, in one or more arbitrary geographic regions. Thus, conventional systems choose one or more servers to store the media streams without considering the geographic region from which the media streams originated. However, when a media stream originates in a given geographic region, the regulations governing that geographic region may require the media stream to be stored in that geographic region, and stored in a particular manner to ensure compliance with privacy regulations in that geographic region. The regulations may include any suitable data sovereignty law, rule, etc. Conventional systems would regularly violate such regulations by storing the media streams in the cloud rather than in the geographic region.

Accordingly, coordination server 120, server 105(1), and server 105(2) are provided with media stream storage logic 150, media stream storage logic 155(1), and media stream storage logic 155(2), respectively. Briefly, media stream storage logic 150, media stream storage logic 155(1), and media stream storage logic 155(2) enable system 100 to record teleconferences by storing media streams in accordance with the applicable regional data sovereignty regulations.

In particular, server 105(1) may be configured to serve geographic region 115(1), and server 105(2) may be configured to serve geographic region 115(2). Coordination server 120 may provide, to server 105(1) and server 105(2), an indication to store one or more media streams of a teleconference that is or will be joined by endpoint devices 110(1)-110(4). Server 105(1) may be configured to store the media stream(s) generated by endpoint device 110(1) as stored media stream(s) 160(1). Server 105(1) may be further configured to store the media stream generated by endpoint device 110(2) as part of stored media stream(s) 160(1). Likewise, server 105(2) may be configured to store the media stream(s) generated by endpoint device 110(3) as stored media stream(s) 160(2), and may be further configured to store the media stream generated by endpoint device 110(4) as part of stored media stream(s) 160(2).

In one example, if the teleconference was recorded for thirty minutes, stored media stream(s) 160(1) and stored media stream(s) 160(2) might each include a thirty-minute recording. More specifically, stored media stream(s) 160(1) may include a thirty-minute recording of the audio and video streams generated by endpoint device 110(1) and endpoint device 110(2). Similarly, stored media stream(s) 160(2) may include a thirty-minute recording of the audio and video streams generated by endpoint device 110(3) and endpoint device 110(4).

In another example, if the media stream is tagged with current speaker information, corresponding segments of the media streams may be stored. For instance, server 105(1) may store segments of the media streams generated by endpoint devices 110(1) and 110(2) for which the first or second participants are tagged as the active speaker, but not segments of the media streams generated by endpoint devices 110(1) and 110(2) for which the third or fourth participants are tagged as the active speaker. In any case, server 105(1)—which is located in geographic region 115(1)—may store media stream(s) generated in geographic region 115(1). Similarly, server 105(2)—which is located in geographic region 115(2)—may store any media stream(s) generated in geographic region 115(2).

Server 105(1) and server 105(2) may belong to respective regional services and coordination server 120 may belong to a global service. Thus, server 105(1) and server 105(2) may act as respective regionalized cloud services for geographic regions 115(1) and geographic region 115(2). In one specific example, European Union (EU) services may run in Frankfurt and/or Ireland, both of which belong to the EU. The regional services may be responsible for the recorded media stream and associated data. The regional services may hand off that responsibility to server 105(1) and server 105(2)). It will be appreciated that the regional and global services may include multi-region support, storage backups, and any other suitable features.

The following detailed explanation is provided to illustrate an example process for achieving the techniques described herein. Initially, coordination server 120 may obtain a request to record the teleconference. The request may include an indication of the first, second, third, and fourth participants (and/or endpoint devices 110(1)-110(4)). In one example, coordination server 120 may receive a request to record a scheduled teleconference before the scheduled start time of the teleconference (e.g., when the host selects an option to record a teleconference while scheduling the teleconference). In another example, coordination server 120 may receive a request to begin recording an ongoing teleconference (e.g., when the host selects a "record" button during an ongoing teleconference).

Upon receiving the request, coordination server 120 may determine where the teleconference media streams are (or will be) generated. For example, coordination server 120 may obtain an indication that the first and second participants are located in geographic region 115(1), and the third and fourth participants are located in geographic region 115(2). In one example, coordination server 120 may automatically obtain these indications from a previously stored record. The record may be stored in a system that maintains participant information such as name, user identifier, location, etc. The system may be maintained by the same organization responsible for managing server 105(1), server 105(2), and coordination server 120. Alternatively, the system may be maintained by a third party.

In another example, coordination server 120 may obtain these indications from a host of the teleconference. For instance, if coordination server 120 determines that no previously stored record exists for a given participant, coordination server 120 may prompt the host for the location of that participant. Thus, the host may define the regional services that are used to host the teleconference. Before, during, or after this operation, the host may seek consent from all participants to record the teleconference before the recording begins. The host may be required to do so by relevant local regulations.

In still another example, the respective locations of the participants may also be obtained from the media stream(s), if the media stream(s) are configured to carry that information. For example, server 105(1) and server 105(2) may obtain the location of each participant based on participant identifiers. In still other examples, coordination server 120 may obtain indications of the locations of the participants based on the locations of endpoint devices 110(1)-110(4). For example, if endpoint devices 110(1)-110(4) are mobile, coordination server 120 may obtain an indication of the locations of endpoint devices 110(1)-110(4) based on Global Positioning System (GPS) coordinates of endpoint devices 110(1)-110(4). If endpoint devices 110(1)-110(4) are fixed, coordination server 120 may obtain an indication of the locations of endpoint devices 110(1)-110(4) based on a previously stored record of locations of endpoint devices 110(1)-110(4).

Once coordination server 120 has determined that the teleconference media streams are (or will be) generated in geographic region 115(1) and in geographic region 115(2), coordination server 120 may look up location ruleset 165 to determine the applicable regulations for the teleconference. Location ruleset 165 may include the regulations that apply to respective geographic locations. Thus, coordination server 120 may identify the applicable regulations for geographic region 115(1) and geographic region 115(2) based on location ruleset 165. In this example, geographic region 115(1) restricts storage of locally generated media streams to geographic region 115(1); in other words, such data may not be stored outside of geographic region 115(1). Similarly, geographic region 115(2) restricts storage of locally generated media streams to geographic region 115(2); in other words, such data may not be stored outside of geographic region 115(2).

Coordination server 120 may also generate global meeting record 170. Global meeting record 170 may include a global (e.g. parent) meeting identifier of the teleconference. The global meeting identifier may be any suitable identifier, such as a Universally Unique Identifier (UUID). Global meeting record 170 may also include first and second local meeting identifiers of the teleconference for use in geographic region 115(1) and geographic region 115(2). The local meeting identifiers may be any suitable local identifiers for the teleconference. Global meeting record 170 may associate the global meeting identifier with the first and second local meeting identifiers. Global meeting record 170 may also include a list of participant identifiers (e.g., UUIDs) for attendees of the teleconference, as well as a defined time-series of identifiers/regions to enable coordination server 120 to synchronize the recording for playback.

Based on the indication that the first and second participants are located in geographic region 115(1), and the indication that the third and fourth participants are located in geographic region 115(2), coordination server 120 may provide, to server 105(1) and server 105(2), an indication to store the one or more media streams of the teleconference. In one example, coordination server 120 may provide the global meeting identifier and the first local meeting identifier to server 105(1) with an indication to store media streams generated by endpoint devices 110(1) and 110(2). Similarly, coordination server 120 may provide the global meeting identifier and the second local meeting identifier to server 105(2) with an indication to store media streams generated by endpoint devices 110(3) and 110(4).

Upon receiving the indication to store the teleconference media streams, server 105(1) and server 105(2) may generate local meeting record 175(1) and local meeting record 175(2), respectively. Local meeting record 175(1) may associate the global meeting identifier with the first local meeting identifier, and local meeting record 175(2) may associate the global meeting identifier with the second local meeting identifier. Server 105(1) may thus be configured to store teleconference media streams generated by endpoint devices 110(1) and 110(2). Similarly, server 105(2) may be configured to store teleconference media streams generated by endpoint devices 110(3) and 110(4). Each meeting identifier may be unique.

During the teleconference, endpoint devices 110(1)-110(4) may generate and share media streams over network 125. To ensure compliance with local regulations, each of the media streams may be forked into two branches: one "live" media stream that is shared over network 125 during the teleconference, and one media stream that is transmitted to server 105(1) or server 105(2). For instance, audio and video streams generated by endpoint device 110(1) may be forked, with one branch being transmitted to endpoint devices 110(2)-110(4) over network 125, and the other branch being transmitted to server 105(1) for storage. The audio and video streams generated by endpoint device 110(1) may fork before leaving geographic region 115(1), in order to comply with local regulations mandating that media streams stored for a recorded teleconference must remain in geographic region 115(1) before the media streams are stored. In another example, server 105(1) and server 105(2) may also store call metrics, tags, and associated analytics for stored media stream(s) 160(1) and 160(2) if local regulations require such call metrics, tags, and associated analytics to be stored locally.

After the teleconference has ended, a user (e.g., participant, host, non-participant, etc.) may access the recorded teleconference. The user may initiate a request for playback of the recorded teleconference via any suitable endpoint device, including one of endpoint devices 110(1)-110(4) or an endpoint device that did not join the teleconference. The endpoint device may be located in any suitable geographic region.

The endpoint device may provide the request for playback to coordination server 120. Based on the request for playback, coordination server 120 may send, to server 105(1) and server 105(2), a request for stored media stream(s) 160(1) and stored media stream(s) 160(2). In response, server 105(1) and server 105(2) may process stored media stream(s) 160(1) and stored media stream(s) 160(2), respectively, for playback. For example, server 105(1) and server 105(2) may utilize recording analytics to determine which media stream segments apply to a given speaker. Server 105(1) and server 105(2) may process stored media stream(s) 160(1) and stored media stream(s) 160(2) for playback in accordance with applicable regulations for geographic region 115(1) and geographic region 115(2). For example, the regulations may require stored media stream(s) 160(1) and stored media stream(s) 160(2) to be processed locally.

Server 105(1) and server 105(2) may include or have access to the applicable regulations for geographic region 115(1) and geographic region 115(2), respectively, to ensure playback of stored media stream(s) 160(1) and stored media stream(s) 160(2) is permitted and comply with the applicable regulations. Once server 105(1) and server 105(2) have processed stored media stream(s) 160(1) and stored media stream(s) 160(2) for playback, server 105(1) and server 105(2) may provide stored media stream(s) 160(1) and stored media stream(s) 160(2), respectively, to coordination server 120. Thus, coordination server 120 may obtain stored media stream(s) 160(1) from server 105(1), and stored media stream(s) 160(2) from server 105(2).

Coordination server 120 may determine that server 105(1) and 105(2) store subsets of the recorded teleconference (e.g., stored media stream(s) 160(1) and stored media stream(s) 160(2)). Based on that determination, coordination server 120 may synchronize/stitch/align stored media stream(s) 160(1) and stored media stream(s) 160(2) to generate one or more synchronized media streams. Thus, coordination server 120 may merge multiple streams (e.g., stored media stream(s) 160(1) and stored media stream(s) 160(2)) into a single, synchronized stream.

Coordination server 120 may use media/data tags to synchronize stored media stream(s) 160(1) and stored media stream(s) 160(2) and simultaneously play out stored media stream(s) 160(1) and stored media stream(s) 160(2). Server 105(1) and server 105(2) may tag stored media stream(s) 160(1) and stored media stream(s) 160(2), respectively, after or during storing or processing of stored media stream(s) 160(1) and stored media stream(s) 160(2). Server 105(1) may tag stored media stream(s) 160(1) to indicate when the meeting starts and ends, and when the first user of endpoint device 110(1) and the second user of endpoint device 110(2) is/are speaking. Similarly, server 105(2) may tag stored media stream(s) 160(2) to indicate when the meeting starts and ends, and when the third user of endpoint device 110(3) and the fourth user of endpoint device 110(4) is/are speaking. The tags may be formatted as "speaker:<region id>:<speaker uuid>:<utc timestamp>" and "meeting:<start/end>:<utc timestamp>." For instance, coordination server 120 may synchronize stored media stream(s) 160(1) and stored media stream(s) 160(2) using the "meeting:start:<utc timestamp>" tag and buffer the one or more synchronized media streams to provide a staged view of the teleconference.

Two specific use cases for playback are discussed: one for scheduled recordings, and the other for non-scheduled/spontaneous/on-demand recordings. In the case of a scheduled recording, coordination server 120 may synchronize stored media stream(s) 160(1) and stored media stream(s) 160(2) based on one or more timestamps corresponding to a scheduled start time of the teleconference. In this example, coordination server 120 may provide, to server 105(1) and server 105(2), a request to record a teleconference that is scheduled for a given start time. That is, coordination server 120 may provide, to server 105(1) and server 105(2), an indication to store one or more media streams of a teleconference that will be joined by endpoint devices 110(1)-110(4). The request to record the teleconference may indicate that server 105(1) and server 105(2) should begin recording at the start time of the teleconference. In one example, the request may include a timestamp of the start time of the teleconference. Thus, stored media stream(s) 160(1) and stored media stream(s) 160(2) may be tagged with the same "meeting:start:<utc timestamp>," which coordination server 120 may align for playback.

In the case of a non-scheduled recording, coordination server 120 may synchronize stored media stream(s) 160(1) and stored media stream(s) 160(2) based on one or more timestamps corresponding to an on-demand recording time of the teleconference. In this example, coordination server 120 may provide, to server 105(1) and server 105(2), a request to record an ongoing teleconference. That is, coordination server 120 may provide, to server 105(1) and server 105(2), an indication to store one or more media streams of a teleconference that is joined by endpoint devices 110(1)-110(4) (e.g., is currently being joined or has already been joined by endpoint devices 110(1)-110(4)). Coordination server 120 may provide the request to record the teleconference in response to the host (e.g., the first user) selecting a "record" button.

The request to record the teleconference may indicate that server 105(1) and server 105(2) should begin recording a given (short) time in the future. In one example, the request may include a timestamp of the given time. The given time may be chosen such that both server 105(1) and server 105(2) will receive and process the request in time to begin recording at the given time. This may ensure that server 105(1) and server 105(2) begin recording at the same time (i.e., at the given time); starting the respective recordings at different times would hinder coordination server 120 in synchronizing stored media stream(s) 160(1) and stored media stream(s) 160(2). Server 105(1) and server 105(2) may comply with the "meeting:start:<utc timestamp>" tag in order to permit coordination server 120 to align each "meeting:start:<utc timestamp>" tag for playback.

Once coordination server 120 has synchronized stored media stream(s) 160(1) and stored media stream(s) 160(2), coordination server 120 may provide the one or more synchronized media streams for playback. Coordination server 120 may provide the one or more synchronized media streams to the endpoint device from which the request for playback was received, and the endpoint device may output the one or more synchronized media streams for the user. For example, the endpoint device may display synchronized video on a screen and/or output synchronized audio from a speaker. The synchronized video and audio may include video and audio originally generated by each of endpoint devices 110(1)-110(4), thus providing a complete recording of the teleconference.

While coordination server 120 is illustrated as a single server in FIG. 1, coordination server 120 may include one or more servers configured to provide one or more services. For example, coordination server 120 may include a first set of one or more servers configured to manage teleconference recording, and a second set of one or more servers configured to manage recording playback. Other embodiments may be envisioned.

Furthermore, in the example of FIG. 1, server 105(1) and server 105(2) are located in geographic region 115(1) and geographic region 115(2), respectively; however, if the local regulations do not require locally generated media streams to be stored locally, and instead mandate other requirements associated with the locally generated media streams, then server 105(1) and server 105(2) may not necessarily need to be located in geographic region 115(1) or geographic region 115(2). Thus, in other examples, server 105(1) and server 105(2) may be located in any suitable geographic region. For example, local regulations may permit server 105(1) to store media streams generated by endpoint devices 110(1) and 110(2), even if server 105(1) is located outside geographic region 115(1). The local regulations may instead restrict certain operations that server 105(1) can perform while storing the locally generated media streams. Such operations may relate to data security, retention, access (e.g., cross border access), processing, etc.

Figure 2:
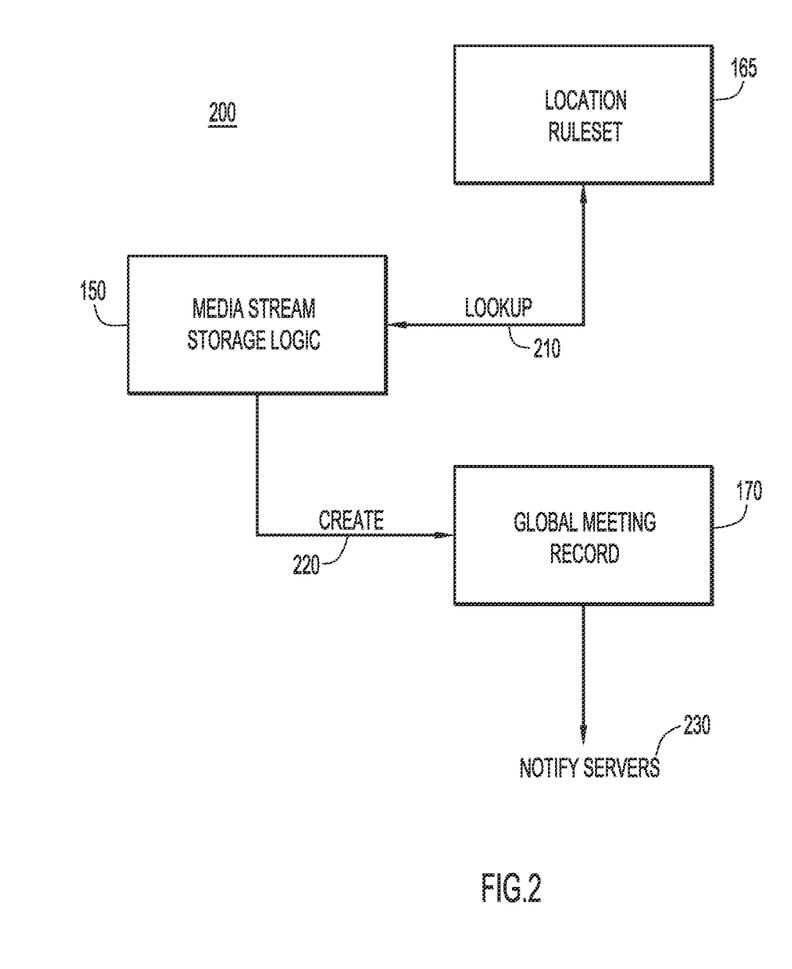
FIG. 2 illustrates a flow for generating an indication for one or more servers to store one or more media streams, according to an example embodiment.

With continued reference to FIG. 1, FIG. 2 illustrates an example flow 200 for coordination server 120 to generate an indication for server 105(1) and server 105(2) to store one or more media streams. At operation 210, media stream storage logic 150 causes coordination server 120 to look up location ruleset 165 to determine the applicable regulations for the teleconference. At operation 220, media stream storage logic 150 causes coordination server 120 to generate/create global meeting record 170. At operation 230, coordination server 120 provides the indication to store the one or more media streams of the teleconference to server 105(1) and server 105(2). In particular, coordination server 120 may notify server 105(1) of the global meeting identifier and the first local meeting identifier. Coordination server 120 may also notify server 105(2) of the global meeting identifier and the second local meeting identifier.

With continued reference to FIG. 1, FIGS. 3-5 relate to an example use case involving a teleconference with five total participants. Three participants are located in Germany, Ireland, and England, respectively, and the other two participants are located in the United States of America (USA). In this example, both Germany and Ireland belong to a first geographic region (the EU), England belongs to a second geographic region, and the USA belongs to a third geographic region. Each geographic region is governed by respective regulations.

Figure 3:
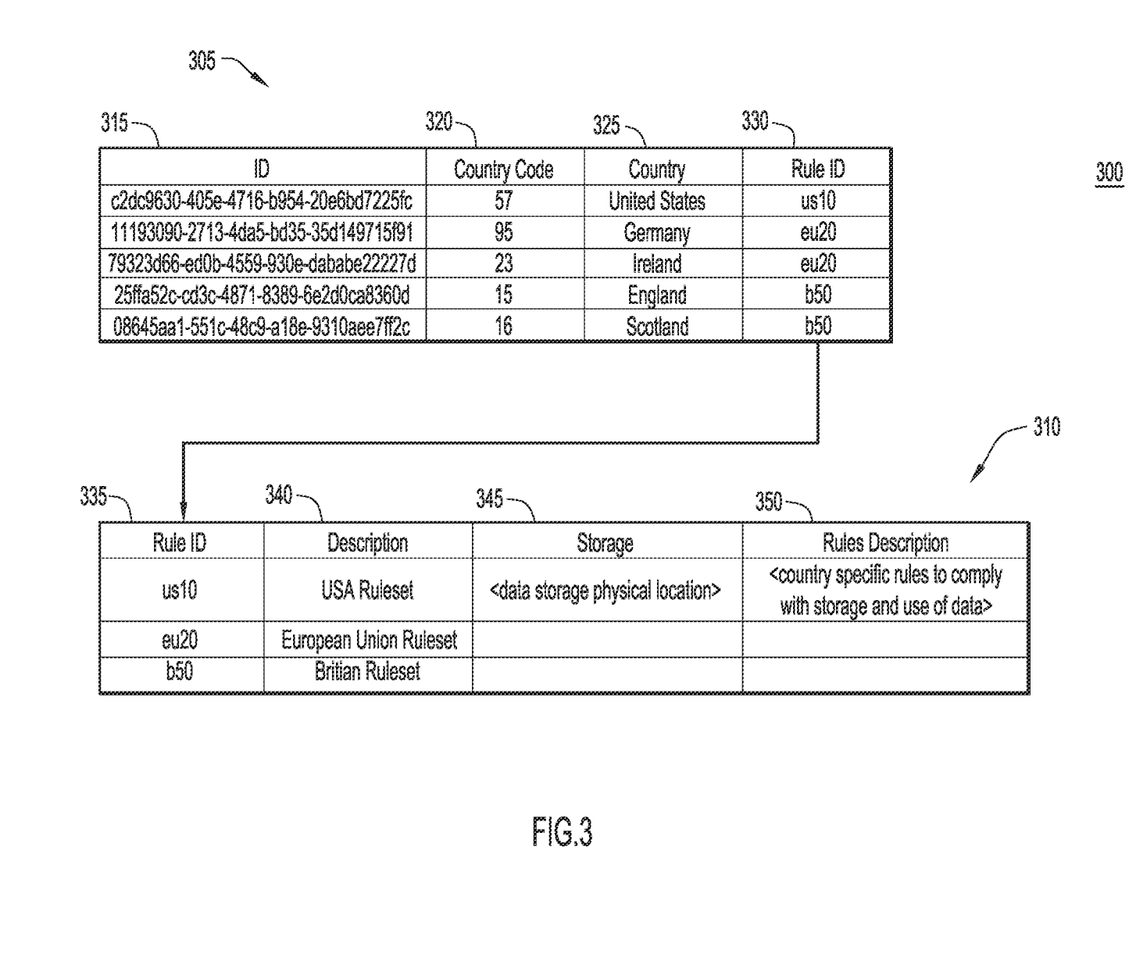
FIG. 3 illustrates a location ruleset defining media stream storage rules for respective geographic regions, according to an example embodiment.

Referring first to FIG. 3, shown is an example location ruleset 300. Location ruleset 300 may be an example of location ruleset 165, and as such may be stored in coordination server 120. Location ruleset 300 includes table 305 and table 310. Table 305 includes lookup identifier column/field 315, country code column 320, country column 325, and rule identifier column 330. Table 310 includes rule identifier column 335, description column 340, storage column 345, and rules description column 350. It will be appreciated that table 305 and table 310 may include any suitable number of entries/rows. Table 305 and table 310 may be relatively static indicators of the applicable regulations for various geographic regions, though table 305 and table 310 may be updated to account for changes to the applicable regulations for a given geographic region (e.g., when a rule is adopted or modified).

Lookup identifier column 315 includes unique identifiers for the entries (rows) in table 305. Country code column 320 includes country codes for respective countries, and country column 325 includes the corresponding countries. For example, the country code for the USA ("United States") is 57. Rule identifier column 330 includes references to regulations that apply for each country. For example, "us10" is a reference to the data storage and processing regulations that govern the USA.

Rule identifier column 335 includes the same entries as rule identifier column 330. Description column 340 includes an explanation of the regulations that are referenced in rule identifier column 335. For example, "us10" refers to the "USA Ruleset." Storage column 345 includes an indication of the physical location of the local server where the data is stored. For example, if geographic region 115(1) is the USA, the top entry in storage column 345 may identify the physical location of server 105(1) in the USA. Rules description column 350 includes a description of the country-specific rules/regulations to comply with storage and use of data. For example, the top entry in rules description column 350 may indicate that data generated in the USA must be stored in the USA.

Coordination server 120 may identify the relevant regulation references in table 305, and look up the corresponding regulations in table 310. As shown in table 305, the USA is governed by the "us10" ruleset. Germany and Ireland are both governed by the "eu20" ruleset, because both Germany and Ireland belong to the EU. England, meanwhile, is governed by the "b50" ruleset. Thus, coordination server 120 identifies three distinct rulesets (us10, eu20, and b50) that will control how the teleconference data is stored for the five participants located in Germany, Ireland, England, and the USA.

Figure 4:
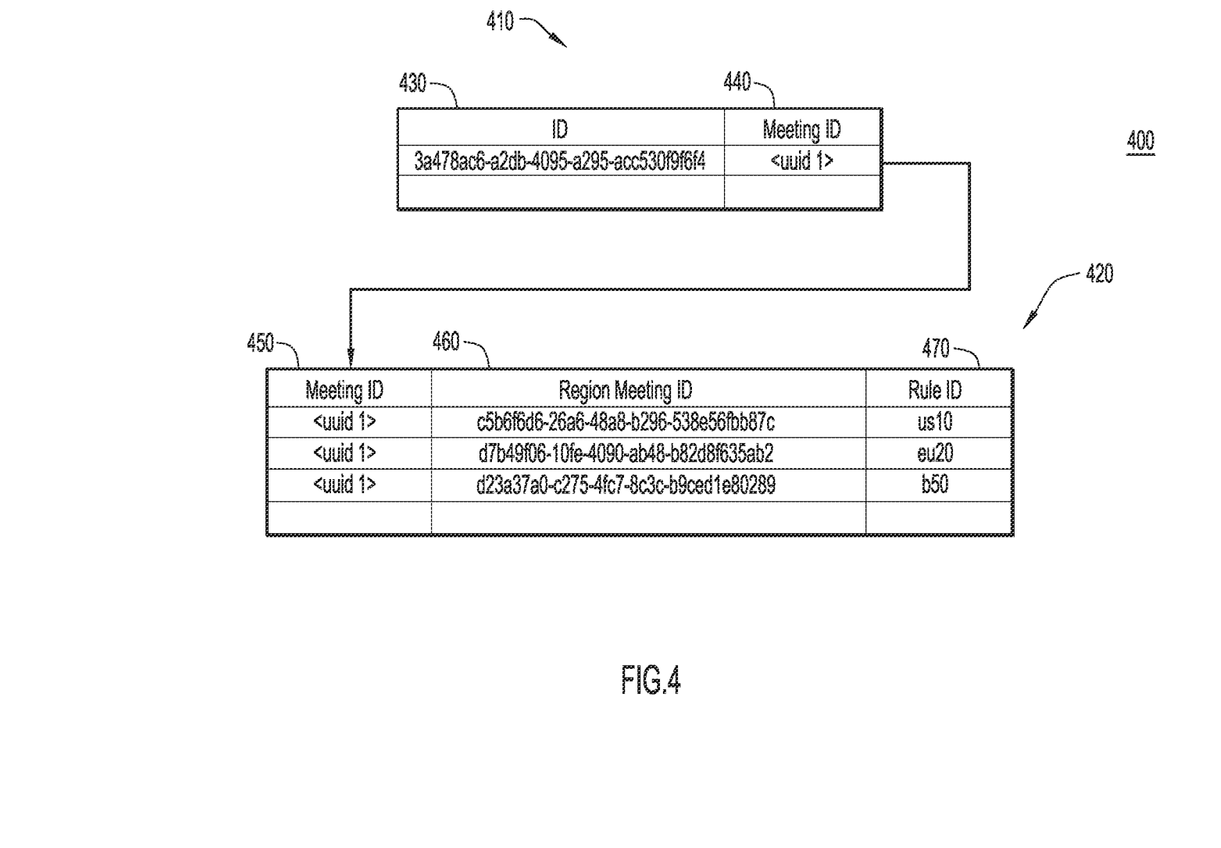
FIG. 4 illustrates a global meeting record that includes a global meeting identifier of a teleconference and corresponding local meeting identifiers of the teleconference, according to an example embodiment.

FIG. 4 illustrates an example global meeting record 400. Global meeting record 400 may be an example of global meeting record 170, and as such may be stored in coordination server 120. Global meeting record 400 includes table 410 and table 420. Table 410 includes lookup identifier column 430 and global meeting identifier column 440. Table 420 includes meeting identifier column 450, regional meeting identifier column 460, and rule identifier column 470. It will be appreciated that table 410 and table 420 may include any suitable number of entries/rows.

Lookup identifier column 430 includes a unique identifier for the entry (row) in table 410. Global meeting identifier column 440 includes a meeting identifier for the teleconference ("<uuid 1>"). Meeting identifier column 450 includes the global meeting identifier. Regional meeting identifier column 460 includes respective regional meeting identifiers used by local servers in the USA, EU, and England. Rule identifier column 470 may include the applicable ruleset for a given geographic region.

Coordination server 120 may generate global meeting record 400 in response to performing a lookup of location ruleset 300. This may ensure that the applicable rules for the USA, EU, and England are loaded for compliance. In particular, coordination server 120 may use table 410 to identify the global meeting identifier for the teleconference, and may further use table 420 to identify the corresponding local meeting identifiers. Global meeting record 400 may also serve as a record of the meeting and be used for playback. In instances where the meeting is scheduled, global meeting record 400 may be created before the meeting, thereby allowing meeting participants to join via respective regional meeting services. Once global meeting record 400 has been generated, coordination server 120 may provide the global meeting identifier to all the local servers (e.g., server 105(1) and server 105(2)). Coordination server 120 may also provide respective local meeting identifiers to respective local servers.

Figure 5:
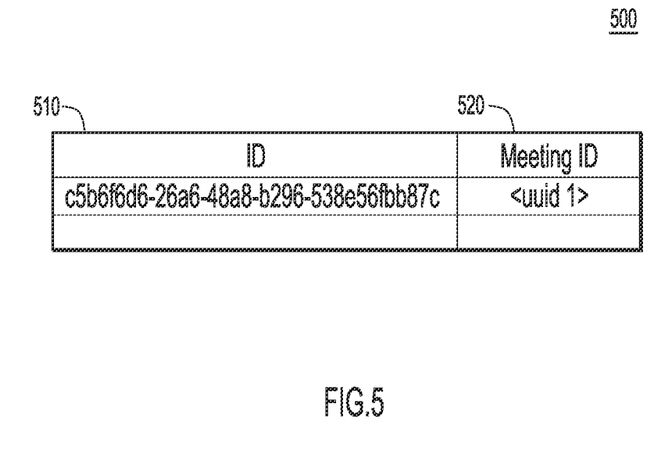
FIG. 5 illustrates a local meeting record that includes a local meeting identifier of a teleconference, according to an example embodiment.

FIG. 5 illustrates an example local meeting record 500. Local meeting record 500 may be an example of local meeting record 175(1), and as such may be created and stored in server 105(1) based on the global and local meeting identifiers received from coordination server 120. Local meeting record 500 includes regional meeting identifier column 510 and global meeting identifier column 520. Regional meeting identifier column 510 includes a local meeting identifier for the teleconference, and global meeting identifier column 520 includes the global meeting identifier for the teleconference. It will be appreciated that local meeting record 500 may include any suitable number of entries/rows.

The local meeting identifier shown in regional meeting identifier column 510 corresponds to the USA. Similar local meeting records may be created and stored in other servers for the other geographic regions (EU and England). Each participant media stream may be redirected through the associated local server and stored using the corresponding local meeting identifier. In one example, the media streams generated for the two USA participants may be stored together in a server in the USA; the media streams generated for the two EU participants may be stored together in a server in the EU; and the media stream(s) generated for the England participant may be stored in a server in England.

Figure 6:
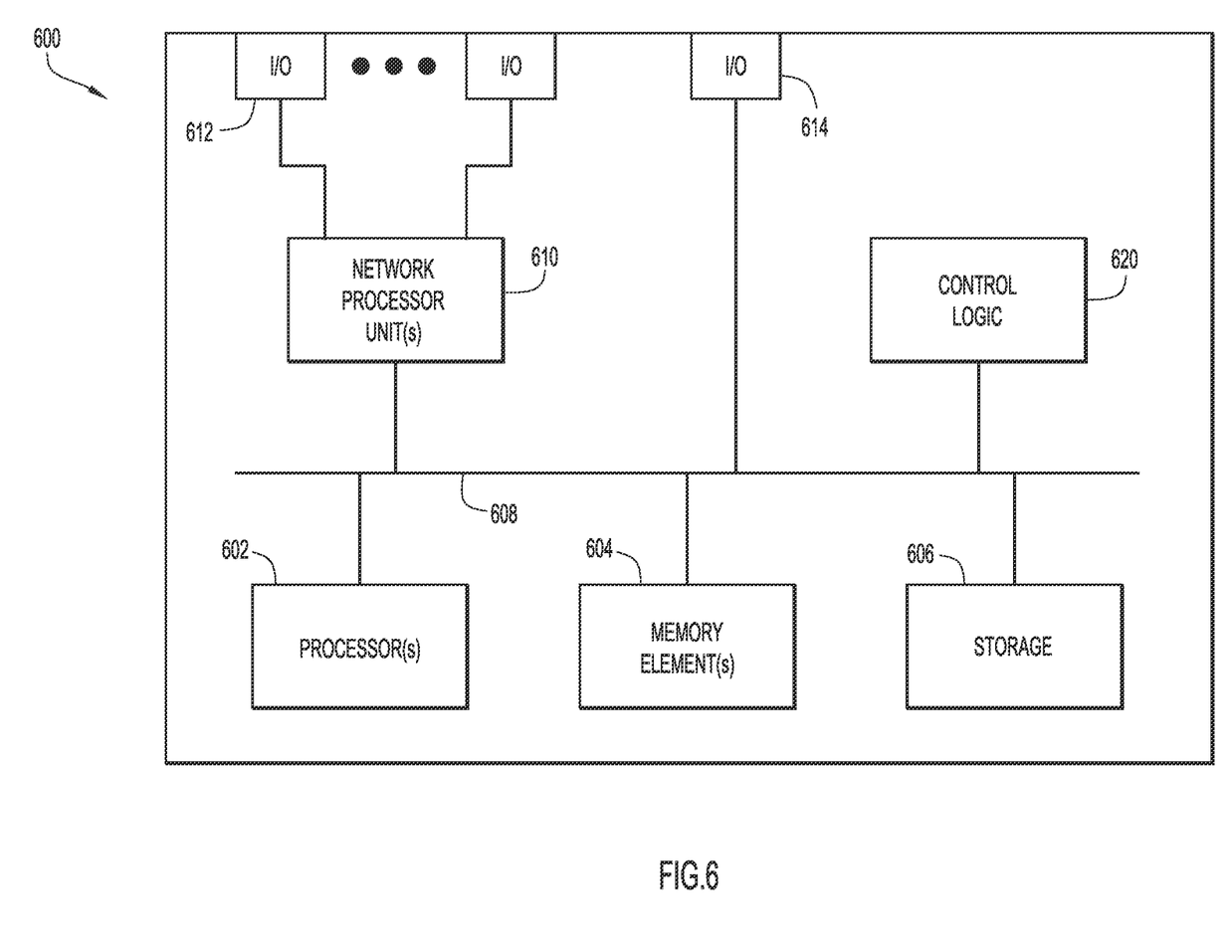
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 600 for transfer onto another computer readable storage medium.

Figure 7:
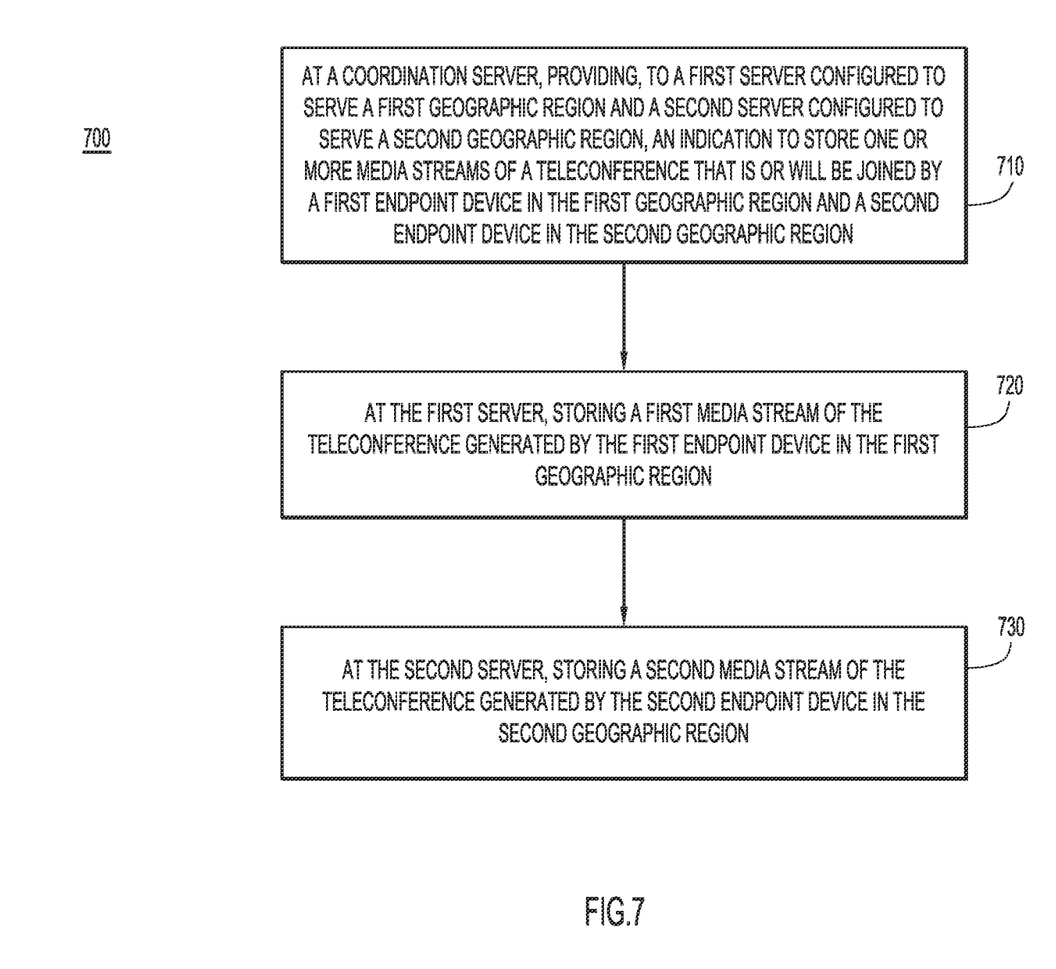
FIG. 7 illustrates a flowchart of a method for performing functions associated with operations discussed herein, according to an example embodiment.

FIG. 7 is a flowchart of an example method 700 for performing functions associated with operations discussed herein. Method 700 may be performed by any suitable entity/entities, such as server 105(1), server 105(2), and/or coordination server 120. At operation 710, a coordination server provides, to a first server configured to serve a first geographic region and a second server configured to serve a second geographic region, an indication to store one or more media streams of a teleconference that is or will be joined by a first endpoint device in the first geographic region and a second endpoint device in the second geographic region. At operation 720, the first server stores a first media stream of the teleconference generated by the first endpoint device in the first geographic region. At operation 730, the second server stores a second media stream of the teleconference generated by the second endpoint device in the second geographic region.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a system is provided. The system comprises: a first server configured to serve a first geographic region; a second server configured to serve a second geographic region; and a coordination server configured to provide, to the first server and the second server, an indication to store one or more media streams of a teleconference that is or will be joined by a first endpoint device in the first geographic region and a second endpoint device in the second geographic region, the first server being configured to store a first media stream of the teleconference generated by the first endpoint device in the first geographic region, and the second server being configured to store a second media stream of the teleconference generated by the second endpoint device in the second geographic region.

In one example, the coordination server is configured to provide the indication to store the one or more media streams of the teleconference by: generating a global meeting identifier of the teleconference; and providing the global meeting identifier of the teleconference to the first server and the second server.

In one example, the coordination server is configured to provide the indication to store the one or more media streams of the teleconference by: generating a first local meeting identifier of the teleconference and a second local meeting identifier of the teleconference; providing the first local meeting identifier to the first server; and providing the second local meeting identifier to the second server.

In one example, the coordination server is further configured to: obtain an indication that a first participant who is or will be attending the teleconference is located in the first geographic region; and obtain an indication that a second participant who is or will be attending the teleconference is located in the second geographic region, wherein the coordination server is configured to provide the indication to store the one or more media streams of the teleconference based on the indication that the first participant is located in the first geographic region and the indication that the second participant is located in the second geographic region. In a further example, the coordination server is configured to: obtain the indication that the first participant is located in the first geographic region from a previously stored record. In another further example, the coordination server is configured to: obtain the indication that the first participant is located in the first geographic region from a host of the teleconference.

In one example, the coordination server is further configured to: obtain the first media stream from the first server; obtain the second media stream from the second server; synchronize the first media stream and the second media stream to generate one or more synchronized media streams; and provide the one or more synchronized media streams for playback. In a further example, the coordination server is configured to synchronize the first media stream and the second media stream based on one or more timestamps corresponding to a scheduled start time of the teleconference. In another further example, the coordination server is configured to synchronize the first media stream and the second media stream based on one or more timestamps corresponding to an on-demand recording time of the teleconference. In still another further example, the first server is further configured to process the first media stream for the playback, and the second server is further configured to process the second media stream for the playback.

In one example, the teleconference is or will be joined further by a third endpoint device in the first geographic region, and wherein: the first server in the first geographic region is further configured to store a third media stream of the teleconference generated by the third endpoint device in the first geographic region.

In one example, the first media stream includes one or more of a first audio stream or a first video stream generated by the first endpoint device in the first geographic region; and the second media stream includes one or more of a second audio stream or a second video stream generated by the second endpoint device in the second geographic region.

In one example, the first server is located in the first geographic region, and the second server is located in the second geographic region.

In another form, a method is provided. The method comprises: at a coordination server, providing, to a first server configured to serve a first geographic region and a second server configured to serve a second geographic region, an indication to store one or more media streams of a teleconference that is or will be joined by a first endpoint device in the first geographic region and a second endpoint device in the second geographic region; at the first server, storing a first media stream of the teleconference generated by the first endpoint device in the first geographic region; and at the second server, storing a second media stream of the teleconference generated by the second endpoint device in the second geographic region.

In another form, one or more non-transitory computer readable storage media are provided. The non-transitory computer readable storage media are encoded with instructions that, when executed by one or more processors, cause the one or more processors to: at a coordination server, provide, to a first server configured to serve a first geographic region and a second server configured to serve a second geographic region, an indication to store one or more media streams of a teleconference that is or will be joined by a first endpoint device in the first geographic region and a second endpoint device in the second geographic region; at the first server, store a first media stream of the teleconference generated by the first endpoint device in the first geographic region, and at the second server, store a second media stream of the teleconference generated by the second endpoint device in the second geographic region.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:
   a network interface configured to obtain or provide network communications; and
   one or more processors coupled to the network interface, wherein the one or more processors are configured to:
      provide to a first server configured to serve a first geographic region, an indication to store a first media stream generated by a first endpoint device in the first geographic region;
      provide to a second server configured to serve a second geographic region, an indication to store a second media stream generated by a second endpoint device in the second geographic region; and
      provide, to the first server, an indication to store a third media stream generated by a third endpoint device in the first geographic region.

2. The apparatus of claim 1, wherein the one or more processors are further configured to:
   obtain an indication that a first user of the first endpoint device is located in the first geographic region;
   provide the indication to store the first media stream based on the indication that the first user is located in the first geographic region;
   obtain an indication that a second user of the second endpoint device is located in the second geographic region; and
   provide the indication to store the second media stream based on the indication that the second user is located in the second geographic region.

3. The apparatus of claim 1, wherein the one or more processors are further configured to:
   obtain the first media stream from the first server;
   obtain the second media stream from the second server; and
   synchronize the first media stream and the second media stream to generate one or more synchronized media streams.

4. The apparatus of claim 3, wherein the one or more processors are further configured to:
   provide the one or more synchronized media streams for playback.

5. The apparatus of claim 1, wherein:
   the first media stream includes one or more of a first audio stream or a first video stream generated by the first endpoint device in the first geographic region; and
   the second media stream includes one or more of a second audio stream or a second video stream generated by the second endpoint device in the second geographic region.

6. The apparatus of claim 1, wherein the first server is located in the first geographic region, and the second server is located in the second geographic region.

7. The apparatus of claim 1, wherein the first geographic region includes a first location and a second location.

8. A method comprising:
   providing to a first server configured to serve a first geographic region, an indication to store a first media stream generated by a first endpoint device in the first geographic region;
   providing to a second server configured to serve a second geographic region, an indication to store a second media stream generated by a second endpoint device in the second geographic region; and
   providing, to the first server, an indication to store a third media stream generated by a third endpoint device in the first geographic region.

9. The method of claim 8, further comprising:
   obtaining an indication that a first user of the first endpoint device is located in the first geographic region;
   providing the indication to store the first media stream based on the indication that the first user is located in the first geographic region;
   obtaining an indication that a second user of the second endpoint device is located in the second geographic region; and
   providing the indication to store the second media stream based on the indication that the second user is located in the second geographic region.

10. The method of claim 8, further comprising:
    obtaining the first media stream from the first server;
    obtaining the second media stream from the second server; and
    synchronizing the first media stream and the second media stream to generate one or more synchronized media streams.

11. The method of claim 10, further comprising:
    providing the one or more synchronized media streams for playback.

12. The method of claim 8, wherein:
    the first media stream includes one or more of a first audio stream or a first video stream generated by the first endpoint device in the first geographic region; and
    the second media stream includes one or more of a second audio stream or a second video stream generated by the second endpoint device in the second geographic region.

13. The method of claim 8, wherein the first server is located in the first geographic region, and the second server is located in the second geographic region.

14. The method of claim 8, wherein the first geographic region includes a first location and a second location.

15. One or more non-transitory computer readable storage media encoded with instructions that, when executed by one or more processors, cause the one or more processors to:
    provide to a first server configured to serve a first geographic region, an indication to store a first media stream generated by a first endpoint device in the first geographic region;
    provide to a second server configured to serve a second geographic region, an indication to store a second media stream generated by a second endpoint device in the second geographic region; and provide, to the first server, an indication to store a third media stream generated by a third endpoint device in the first geographic region.

16. The one or more non-transitory computer readable storage media of claim 15, wherein the instructions further cause the one or more processors to:
   obtain an indication that a first user of the first endpoint device is located in the first geographic region;
   provide the indication to store the first media stream based on the indication that the first user is located in the first geographic region;
   obtain an indication that a second user of the second endpoint device is located in the second geographic region; and
   provide the indication to store the second media stream based on the indication that the second user is located in the second geographic region.

17. The one or more non-transitory computer readable storage media of claim 15, wherein the instructions further cause the one or more processors to:
   obtain the first media stream from the first server;
   obtain the second media stream from the second server; and
   synchronize the first media stream and the second media stream to generate one or more synchronized media streams.

18. The one or more non-transitory computer readable storage media of claim 17, wherein the instructions further cause the one or more processors to:
   provide the one or more synchronized media streams for playback.

19. The one or more non-transitory computer readable storage media of claim 15, wherein:
   the first media stream includes one or more of a first audio stream or a first video stream generated by the first endpoint device in the first geographic region; and
   the second media stream includes one or more of a second audio stream or a second video stream generated by the second endpoint device in the second geographic region.

20. The one or more non-transitory computer readable storage media of claim 15, wherein the first server is located in the first geographic region, and the second server is located in the second geographic region.

* * * * *